United States Patent [19]

Dreibelbis

[11] Patent Number: 4,572,411
[45] Date of Patent: Feb. 25, 1986

[54] VALVE ASSEMBLY FOR A DISPENSING HEAD

[75] Inventor: Richard C. Dreibelbis, Fairlawn, N.J.

[73] Assignee: Emerson Electric Co. (H&H Precision Products Div.), Cedar Grove, N.J.

[21] Appl. No.: 587,710

[22] Filed: Mar. 8, 1984

[51] Int. Cl.⁴ ............................................. A47G 19/14
[52] U.S. Cl. .................................. 222/469; 222/525; 251/263
[58] Field of Search .................. 222/469, 465 R, 559, 222/525, 522, 470, 473; 251/353, 354, 263, 246, 241; 239/577

[56] References Cited

U.S. PATENT DOCUMENTS

| 994,438 | 6/1911 | Baltes | 251/246 |
| 1,490,227 | 4/1924 | Osborn | 251/263 |
| 2,035,202 | 3/1936 | Smith | 251/263 |
| 2,664,266 | 12/1953 | Johnson | 251/353 |
| 3,523,549 | 8/1970 | Anderson | 251/353 |
| 4,453,650 | 6/1984 | Witte et al. | 222/525 |

FOREIGN PATENT DOCUMENTS 477212 12/1937 United Kingdom ............... 251/246

Primary Examiner—Joseph J. Rolla
Assistant Examiner—Kenneth Noland
Attorney, Agent, or Firm—Daniel H. Bobis

[57] ABSTRACT

A valve assembly for a dispensing head with a conventional gooseneck type dispensing spout for filling carafes and the like type containers has a single bore in the center line of the dispensing head for mounting the dispensing spout and operating elements of a valve for controlling the flow of the fluid being dispensed to the inlet or lower end of the dispensing spout, the lower end of the dispensing spout forms the valve head for the valve maintained normally closed, and manual actuating device is provided to lift the dispensing spout so as to move the valve to open position.

4 Claims, 9 Drawing Figures

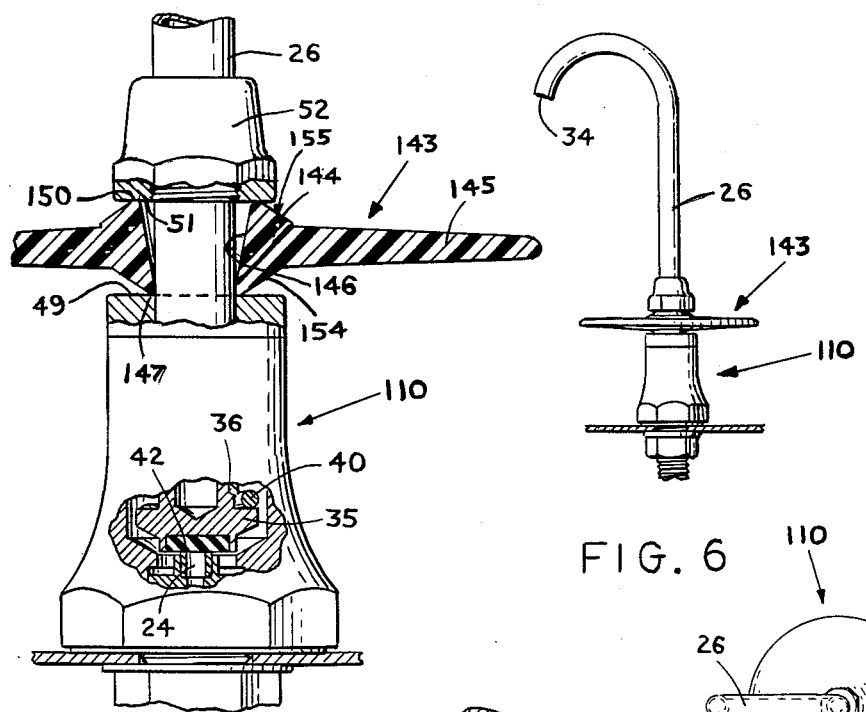
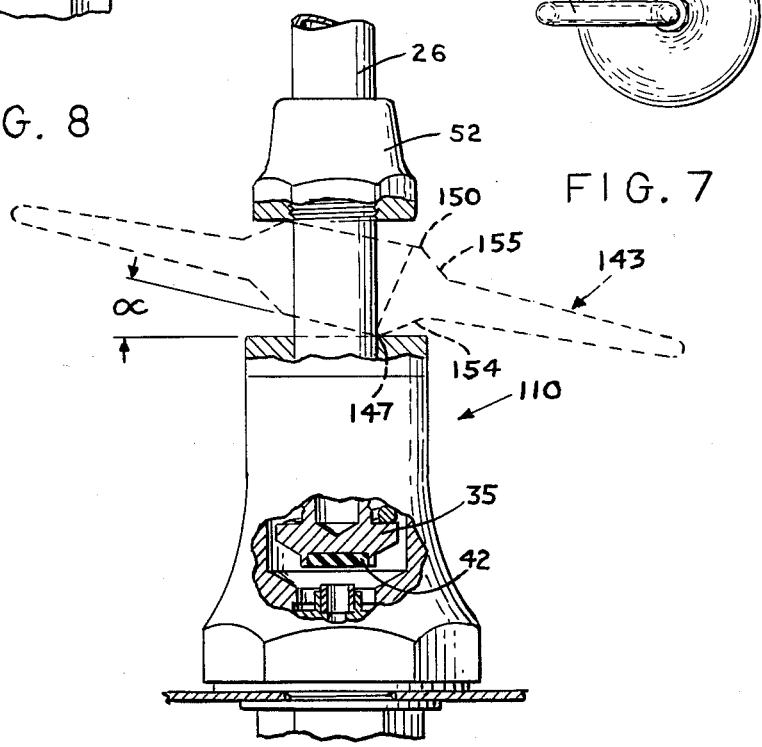
FIG. 6
FIG. 7
FIG. 8
FIG. 9

4,572,411

VALVE ASSEMBLY FOR A DISPENSING HEAD

BACKGROUND OF THE INVENTION

This invention relates generally to dispensing heads for dispensing hot or cold liquids and more particularly to dispensing heads used in shops, offices, restaurants, laboratories and in residential and industrial establishments which must fill glass vessels, carafes and other containers of various shapes and sizes without the necessity of tipping these containers during the filling process and which can be operated by fingertip control of the flow in a wide range of flow rates.

Dispensing heads with conventional goosenecks for filling glass vessels, carafes and the like type of containers include in the valve body a first bore for the gooseneck and a second supplemental bore for the associated and independent valve assembly for controlling the flow of fluid being dispensed to the inlet end of the hollow gooseneck dispensing tube. These devices have been offered for sale on the open market by the In-Sink Erator Division of Emerson Electric Co. identified as their Model P-200 and Model P-284.

The present invention provides an improved valve assembly for a dispensing head for glass vessels, carafe fillers and the like containers in which the operating components of the valve associated with the inlet end of the hollow gooseneck dispensing tube are all disposed on a common centerline which acts to reduce the manufacturing cost of the overall dispensing head by simplifying the construction in that it eliminates the need for a supplemental bore adjacent to the hollow dispensing tube bore of the prior art devices.

Dispensing systems in which the dispensing tube and valve are on the same longitudinal line are shown in U.S. Pat. Nos. 3,514,453; 2,369,356; 1,091,552; 1,080,273; 2,716,535 and 2,936,099.

SUMMARY OF THE INVENTION

Thus the present invention covers an improved valve assembly for a fluid dispensing head having valve body means including, an inlet port for fluid to be dispensed, means forming a combined fluid passage and connecting means for connecting the valve body in operating position and communicating with the source of fluid to be dispensed. Said valve body means having a valve chamber about said inlet port end of the fluid passage means and the valve chamber and inlet port disposed in longitudinal alignment with each other. Said valve body means having a bore in the longitudinal line of said valve chamber and inlet port for slidably mounting the inlet end of a dispensing tube therein. Said dispensing tube having a valve assembly means at the inlet end normally disposed to maintain said inlet port closed, and an inlet means adjacent the inlet end of the dispensing tube in communication with said valve chamber to receive fluid to be dispensed therefrom, and means for actuating the dispensing tube to move the valve head to open position including a manually operated actuator.

Accordingly, it is an object of the present invention to provide an improved dispensing head in which the valve operating components as well as the inlet end of the hollow dispensing tube are on a common centerline to simplify the construction of the dispensing head by eliminating a supplemental bore as used on prior art devices.

These objects and other advantages will become apparent from the description which follows of certain preferred embodiments of the invention as shown in the accompanying drawings in which:

DESCRIPTION OF THE FIGURES

FIG. 6 is a side elevational view of another form of improved dispensing head in accordance with the present invention having a different type of manual operator.

FIG. 7 is a top view of the form of the invention shown in FIG. 6.

FIG. 8 is a view of the improved form of dispensing head shown in FIG. 6 in partial vertical section showing the different type of manual operator in the closed position.

FIG. 9 is the same view as FIG. 8 showing the manual operator in open position.

DESCRIPTION OF THE PREFERRED EMBODIMENT

Figure 3:
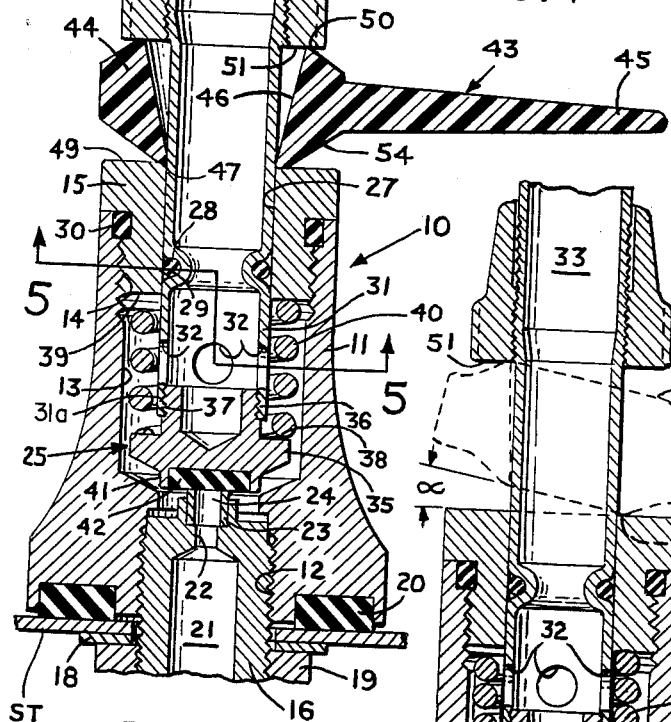
FIG. 3 is a vertical section taken through a portion of the hollow dispensing tube and the valve body of the improved dispensing head shown in FIG. 1 shown in the closed position.
Figure 5:
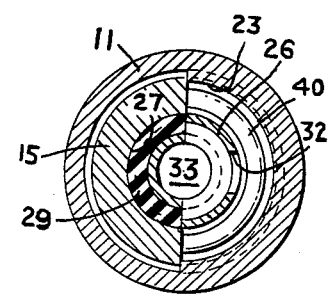
FIG. 5 is a cross-section taken on 5—5 of FIG. 3.
Figure 4:
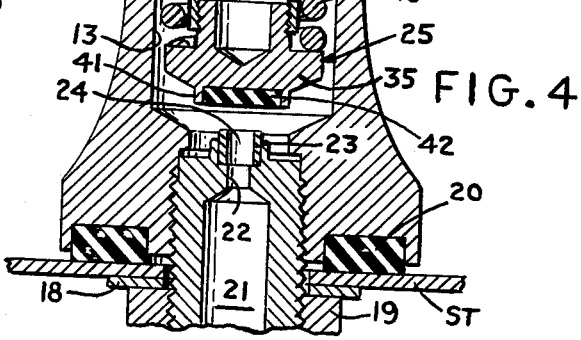
FIG. 4 is an identical view to FIG. 3 showing the valve operating handle in dotted position moved to open position with the valve head in open position.

Referring to the drawings FIGS. 1 to 5 show one form of dispensing head generally designated 10 having the improved valving arrangement in accordance with the present invention wherein a valve body 11 has an internally threaded bore 12 which extends upward from the lower surface thereof in the longitudinal axis so that it communicates and connects with a valve chamber 13 which extends downwardly from the upper end of the valve body and is threaded as at 14 at the open end thereof remote from the internally threaded bore 12 to permit a threaded cover or cap 15 to be connected thereon so as to close the valve chamber 13 as is shown in FIGS. 3, 4 and 5 of the drawings.

Figure 2:
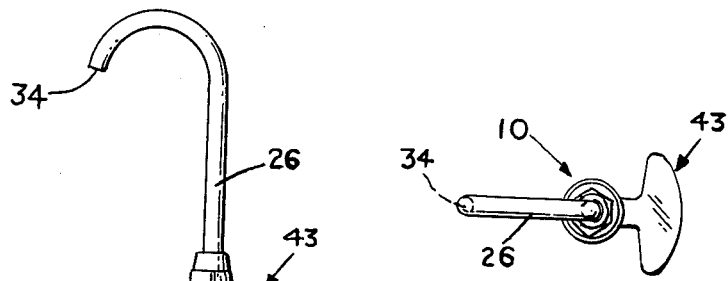
FIG. 2 is a top view of the dispensing head shown in FIG. 1.
Figure 1:
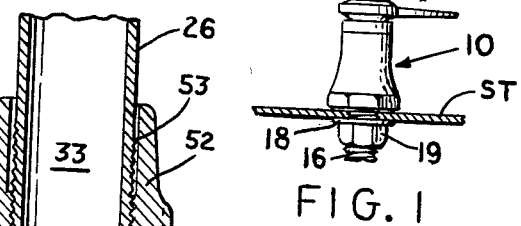
FIG. 1 is a side elevational view of a dispensing head in accordance with the present invention.

FIGS. 1, 3 and 4 show that a connecting nipple 16 is threaded into the internally threaded bore 12 to provide means for connecting the valve body 11 to the sink top ST as by locking washer 18, locking nut 19 and plastic cushion member 20 so as to hold the dispensing head 10 in operative position relative a sink or drain not shown.

The threaded nipple 16 forms a flow passage 21 therethrough which communicates and connects with a source, not shown, of fluid to be dispensed and an outlet passage end 22 which is adjacent to the valve chamber 13 is counterbored to receive an annular sleeve 23 which defines the outlet port 24 for passing the fluid to be dispensed to the valve chamber 13.

A valve assembly generally designated 25 connected to and movable with the gooseneck type hollow dispensing tube 26 is slidably mounted in a generally central bore 27 in the cap or cover 15 as hereinafter more fully described and is disposed in alignment with the longitudinal or vertical axis of the aligned internally threaded bore 27, valve chamber 13 and inlet port 24 movement of the hollow dispensing tube 26 also hereinafter more fully described will act to open and close the valve port 24 all of which is shown in FIGS. 3 and 4 of the drawings.

The hollow dispensing tube 26 is in the form of a conventional gooseneck and those skilled in the art will readily recognize that the dispensing tube 26 may take any of a variety of shapes and lengths different from the gooseneck shape without departing from the scope and function of the hollow dispensing tube 26 in its operative relation to the dispensing head 10.

FIGS. 3, 4 and 5 also show that the portion of the hollow dispensing tube 26 which is slidably disposed in the bore 27 has a circumferential exterior groove 28 struck therein for mounting a first O-ring seal 29 to provide a fluid tight seal between the exterior surface of the dispensing tube 26 and the wall of the bore 27 so that leakage from the valve chamber 13 under the varying operating conditions will be prevented during operation of the dispensing head 10.

Similarly a second O-ring seal 30 is provided between the opened or mouth end of the valve chamber 13 and the threaded cap 15 to provide a fluid tight seal to prevent leakage from the valve chamber 13 through the threaded section 14 on the valve body 11.

The inlet end 31 of the dispensing tube 26 in assembled position extends into the valve chamber 13 and has a plurality of spaced inlet openings as at 32 which provide communication between the valve chamber 13 and the fluid dispensing passage 33 formed by the hollow dispensing tube 26. Thus, when the fluid to be dispensed is passed from the inlet port 24 to the valve chamber 13 on opening of the valve assembly 25 the fluid will flow freely through the inlet openings 32 into the fluid dispensing passage 33 where it will be discharged from the outlet end 34 of the gooseneck dispensing tube 26.

The valve assembly 25 for opening and closing the valve port 24 is operatively connected to the hollow dispensing tube 26 as will now be described.

Thus the valve assembly 25 includes a generally cylindrical valve head member 35 having an annular skirt 36 which is externally threaded as at 37 to engage the internal threads 31a formed on the open end of the inlet end 31 of the hollow dispensing tube 26 so that the valve head 35 can be tightly connected thereto in assembled position. Valve head 35 has a larger diameter than the diameter of the inlet end of the dispensing tube 26 so as to form an annular stop shoulder 38 on the upper face thereof. This stop shoulder 38 coacts with the inner face 39 of the cover or cap 15 so that a spring member 40 can be mounted in the valve chamber about the exterior of the inlet end 31 of the hollow dispensing tube 26 and between the inner face 39 and stop shoulder 38 so as to normally urge the valve head 35 in a direction to maintain the valve port 24 normally closed all of which is clearly shown in FIG. 3 of the drawing.

FIGS. 3 and 4 further show that the lower face of the valve head 35 remote from the stop shoulder 38 is provided with a disc holder 41 in which a plastic disc 42 is mounted so that when the valve head is in the normally closed position, the plastic disc 38 will engage and close the valve port 24 and provide a fluid tight seal therewith.

FIG. 4 shows that when the hollow dispensing tube 26 and the associated valve assembly 25 are actuated by exerting manual force on the operating lever 43 that the valve head 35 can be moved to open position as will now be described.

Thus the operating lever 43 as shown in FIGS. 1, 2, 3 and 4 of the drawing has a collar section 44 and a handle section 45. The collar section 44 is generally annular and has a tapered bore 46 extending end to end therethrough which in assembled position as shown in FIGS. 3 and 4 is disposed about the exterior of the hollow dispensing tube 26 so that the annular lower face 47 will engage and pivot on the adjacent generally parallel upper surface 49 of the cap or cover 15 while the upper face 50 of the collar section will be disposed in engagement with the lower face 51 of an adjusting nut 52 which is threadably mounted on the threaded section 53 on the exterior of the hollow dispensing tube 26 so that the adjusting nut can be moved up and down as shown in FIGS. 3 and 4 when the operating lever 43 is manually depressed and released.

In order to move the adjusting nut 52 and the dispensing tube 26 to which it is fixedly connected, the collar section is further provided with a biased or angled section 54. The biased or angled section 54 will be at an angle such that when the operating handle 45 of the operating lever 43 is depressed manually it will rotate on the lower face or fulcrum 47 and due to the moment of force and the angle $\alpha$ will move the adjusting nut 52 and dispensing tube 26 in the upward direction as is shown in FIG. 4 of the drawings.

The effect of this movement will be to simultaneously lift the valve assembly 25 and the valve head 35 so that the plastic disc 42 clears and opens the valve port 24. This action simultaneously compresses the valve spring 40 as is clearly shown in FIG. 4 of the drawings.

In this position the fluid to be dispensed passes from the fluid passage 21 through the valve port 24 into the valve chamber 13 then through the inlet ports 32 into the fluid dispensing passage 33 to flow through the hollow dispensing tube 26 to the outlet end 34 to the point of use.

DISPENSING HEAD WITH MODIFIED OPERATOR

FIGS. 6, 7, 8 and 9 show a modified dispensing head generally designated 110 in which the control valve arrangement is identical with that above described for the form of the invention shown in FIGS. 1 to 5. Therefore the same character numerals will be used for the elements of the control valve as was used in the description above for the form of the invention shown in FIGS. 1 to 5.

The form of the invention shown in FIGS. 6 to 9 differs from the form of the invention shown in FIGS. 1 to 5 in that the operating lever generally designated 143 is annular so as to permit operating the control valve for the dispensing head 110 from any circumferential position rather than the single point which is the case with the operating lever 43 for the form of the invention shown in FIGS. 1 to 5 of the drawings.

Thus, FIGS. 6, 7, 8 and 9 show that annular operating lever 143 has a 360° circumference and will be made of any suitable type of material preferably a plastic with sufficient rigidity and strength to withstand the manual forces exerted during the operation of the dispensing head. Other materials such as metal alloys may also be used. If plastic materials are used they can be coacted to provide a simulated stainless steel appearance to improve the appearance of the finished product.

The annular operating lever 143 is provided with a control hub or collar section 144 which is substantially thicker than the surrounding manual handle section 145.

The hub or collar section 144 similar to the collar section 44 on the operating lever 43 of the form of the invention shown in FIGS. 1 to 5 is provided with a tapered bore 146 extending end to end therethrough.

In assembled position as shown in FIGS. 6 to 9 the dispensing tube 26 extends through the tapered bore 146 so that the lower face 147 of the annular operating lever 143 will engage the upper face 49 of the cap or cover 15 to provide a fulcrum point about which the annular operating lever 143 will pivot when pressure is exerted manually on the handle section 145.

Similarly the annular upper face 150 of the hub or collar section 144 will be disposed in engagement with the lower face 51 of the adjusting nut 52 in the same manner as above described for the form of the invention shown in FIGS. 1 to 5.

The hub or collar section 144 is provided with a lower annular beveled section 154, and an upper annular beveled section 155 about the respective lower face 147 and upper face 150 so that when the operating lever 143 is depressed by exerting manual force on any portion of the circumferential handle section 145 the annular operating lever 143 will rotate on the fulcrum formed by contact of the lower face 147 with the upper face 49 of the cap or lever 15 through an angle α until the wall of the tapered bore 146 comes into engagement with the outer circumference of the dispensing tube 26 thus causing the upper face 150 to exert a moment of force against the lower face 51 of the adjusting nut 52 which moves the adjusting nut 52 and the dispensing tube 26 in an upward direction, all of which is shown in FIGS. 8 and 9 of the drawings.

The effect of this movement will be to simultaneously lift the valve head 35 so that the plastic disc 42 clears and opens the valve port 24 and spring 40 is compressed all in the same manner as above described for the form of the invention shown in FIGS. 1 to 5 of the drawings.

Therefore, when the manual force exerted on the handle section 145 of the annular operating lever 143 is released the valve head 35 will again return to the closed position as the spring 40 expands.

The annular operating lever 143 will provide a larger moment of force for lifting the adjusting nut 52 and dispensing nozzle 26 and will facilitate operation as by an elbow or other means where required in the use of this control valve.

Those skilled in the art will readily recognize that the annular operating lever 143 can be reversed so that the tapered bore 146 faces down instead of up.

Thus a dispensing head with an improved valve assembly in which all of the valve operating components as well as the inlet end of the dispensing tube 26 are shown and disclosed as disposed on a common centerline or axis so that a single bore assembly can be utilized in the manufacture of this dispensing head which not only simplifies the dispensing head but reduces the manufacturing costs thereof.

It will be understood that the invention is not to be limited to the specific construction or arrangement of parts shown but that they may be widely modified within the invention defined by the claims.

What is claimed is:
1. In a fluid dispensing head,
   a. valve body means including, a main section having, fluid passage means forming an inlet port at one end, connecting means for bringing said fluid passage means into communication with a source of fluid when said valve body means is in an operating position, and valve chamber means in communication and in alignment with said inlet port,
   b. said valve body means having, a bore disposed in alignment with the said inlet port and the centerline of said valve chamber means,
   c. a hollow dispensing tube slidably mounted in fluid tight relationship within said bore,
   d. said dispensing tube having an inlet end, means at the inlet end normally maintaining said inlet port closed, and outlet means for dispensing fluid, and
   e. means for actuating the dispensing tube to move the valve head means to an open position including, a stop member connected on said dispensing tube, fulcrum means having a collar section pivotally disposed between the valve body means and the stop member, and an operating lever connected to said collar section for controlling pivotal movement of said collar section so that the latter engages and moves the stop member and dispensing tube whereby to control the flow of fluid from said dispensing tube, said collar section having a lower face which engages and pivots on said valve body means, a first outwardly diverging beveled section extending from said lower face, an upper face which engages and pivots on said stop member, a second outwardly diverging beveled section extending from said upper face, and a tapered bore surrounding said hollow dispensing tube and diverging from said lower face toward said upper face.

2. In the fluid dispensing head as claimed in claim 1 wherein the means for normally maintaining said inlet port closed includes, a valve head having sealing means sealingly engageable with said inlet port, and spring means disposed in engagement with the valve head for normally maintaining said valve head in sealing relation with said inlet port, and said spring means being compressible on opening movement of the valve head to open said inlet port.

3. In a fluid dispensing head as claimed in claim 1 wherein the stop member is threadably adjustable and fixedly connected on said dispensing tube.

4. In a fluid dispensing head as claimed in claim 1 wherein said collar section is substantially annular and said operating lever is substantially annular, whereby depression of said operating lever along any portion thereof, controls said pivotal movement of said collar section.

* * * * *